United States Patent [19]

Rogman

[11] Patent Number: 5,230,798
[45] Date of Patent: Jul. 27, 1993

[54] LEAF TRAP ASSEMBLY

[76] Inventor: John T. Rogman, 5522 Mt. Zion Rd., Milford, Ohio 45150

[21] Appl. No.: 860,009

[22] Filed: Mar. 30, 1992

[51] Int. Cl.⁵ .......................................... B01D 35/02
[52] U.S. Cl. .................... 210/447; 210/448; 210/454; 210/499; 52/12
[58] Field of Search ............... 20/153, 446, 447, 448, 20/453, 454, 497.01, 499; 52/12

[56] References Cited

U.S. PATENT DOCUMENTS

| | | | |
|---|---|---|---|
| 522,667 | 7/1894 | Minnemeyer | 210/447 |
| 543,922 | 8/1895 | Bucklet et al. | 210/249 |
| 1,076,075 | 10/1913 | Steele | 210/447 |
| 2,532,388 | 12/1950 | Batt, Jr. | 210/90 |
| 2,887,073 | 5/1959 | Thompson | 108/28 |
| 4,470,908 | 9/1984 | Odekirk | 210/463 |

Primary Examiner—Matthew O. Savage
Attorney, Agent, or Firm—Charles R. Wilson

[57] ABSTRACT

A leaf trap assembly is intended for ready installation in a downspout. The assembly comprises an elongated hollow body with a side wall opening and which attaches at each of its ends to downspout sections. A detachable door which covers the opening and a foraminous receptacle mounted for ready removal from the door are also provided in the assembly. The assembly is convenient to use in that it can be installed in the downspout near ground level. Additionally, separation of the door from the assembly and further separation of the receptacle from the door allows the receptacle to be cleaned in a very efficient manner.

19 Claims, 1 Drawing Sheet

LEAF TRAP ASSEMBLY

This invention relates to a leaf trap assembly for use in a downspout. More particularly, the invention relates to a leaf trap assembly interposed in a downspout having the capability for the convenient removal and dumping of collected solid matter.

Downspouts on residential structures are very common. Rain water which flows down a roof is collected in gutters and directed to one or more downspouts. The downspouts further direct the rain water from the gutters to a sewer line or, if the residence is located in a rural area not served by water lines, to a cistern.

Solid matter such as leaves, twigs and other materials which over time tends to collect on roofs and in gutters can eventually work their way into the downspouts. Various mesh-type gutter guards have been devised to hold out larger solids such as leaves to prevent them from clogging up the gutters and downspouts. Smaller solid matters such as leaf fragments which may enter the downspouts can be a problem over time with the residences having a sewer line. Solid matter including even the smaller solid fragments are a problem especially in residences with a cistern. The solid matter will contaminate stored water, thereby affecting its taste, smell and purity.

The problems associated with solid matter clogging downspouts and, in particular, entering a cistern are well recognized. Others have devised various filters and traps in an attempt to alleviate or eliminate the problem. U.S. Pat. Nos. 543,922, 2,532,388, 2,887,073 and 4,470,908 all disclose devices for positioning in a downspout to trap solid matter. Unfortunately, it is apparent that they are difficult to install because of their structure. Additionally, they appear difficult to attend to for periodic inspection and cleaning purposes. U.S. Pat. No. 4,470,908 in particular is inconvenient to use due to the fact a door must be opened and the owner must reach into the device and manually remove any collected matter. It is difficult to remove the solid matter to the degree desired. It is also undesirable in that many individuals simply do not care to dirty their hands.

In accord with a recognized need, there has been developed an assembly for interposing in a downspout. The assembly is readily installed in new construction as well as retrofit construction. The assembly allows for convenient inspection and is easily cleaned in a safe manner.

SUMMARY OF THE INVENTION

A leaf trap assembly is adapted for interposing in a downspout to separate solid matter from rain water flowing through the downspout. The assembly comprises an elongated hollow body dimensioned for attachment to upper and lower sections of a downspout to provide a continued path for the flow of rain water. The hollow body has an opening in one vertical side. A detachable door is dimensioned to cover the hollow body opening. A foraminous receptacle is dimensioned to fit inside the elongated hollow body. The receptacle is mounted on the inside surface of the detachable door in a manner which allows it to be completely separated therefrom. The receptacle has an open top side to allow the solid matter to pass into it and a partially open backside which in use is adjacent the door's inside surface. Latch means are provided on the receptacle and door to permit ready removal and replacement of the receptacle on the door. The receptacle is periodically cleaned by removing the door from the assembly, removing the foraminous receptacle from the door and emptying the receptacle by dumping the solid matter through the open sided backside.

DETAILED DESCRIPTION OF THE INVENTION

The leaf trap assembly of the invention is described in detail in the following paragraphs with reference to the drawings. The components of the assembly as well as the mode of operation of the assembly are described.

Figure 1:
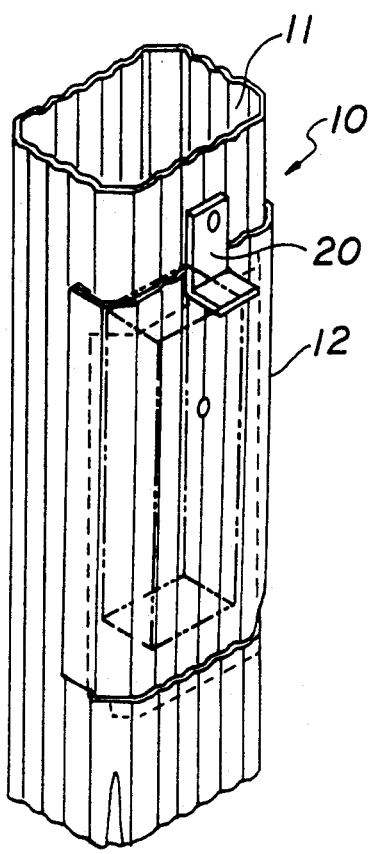
FIG. 1 is a perspective view of the leaf trap assembly of the invention with its door in a closed positioned.

With reference to FIG. 1 there is shown the leaf trap assembly 10 of the invention ready for installation. The assembly can be installed in a downspout to be added as part of new construction or it can be retrofitted to an existing downspout by removing a section thereof. The assembly is most conveniently interposed in the downspout near ground level, though can be interposed in the downspout at other positions as well.

The assembly 10 comprises an elongated hollow body 11, a detachable door 12, and a foraminous receptacle 13 as its essential components. The elongated hollow body 11 has a cross-section area dimensioned for ready attachment to an upper downspout section and a lower downspout section. The cross-section area is approximately equal to the downspout cross-section areas to in effect provide a continuous path for the flow of rain water through the downspout from a roof area to a sewer line or cistern. The terminuses of the hollow body are capable of being flared-out or crimped-in to mate with a downspout section. Joining of downspout sections by a forcing of one section over or into another section is well known in the industry. The fact the elongated hollow body is capable of being installed in such a manner represents a distinct advantage. The workman requires no special tools or additional skills to install the assembly.

The elongated hollow body 11 generally is from about eight inches to about eighteen inches in length, though shorter and longer lengths can be used. As shown in the figures, the hollow body 11 has a rectangular cross-section. It can as well have other shaped cross-sections such as circular in particular.

Figure 2:
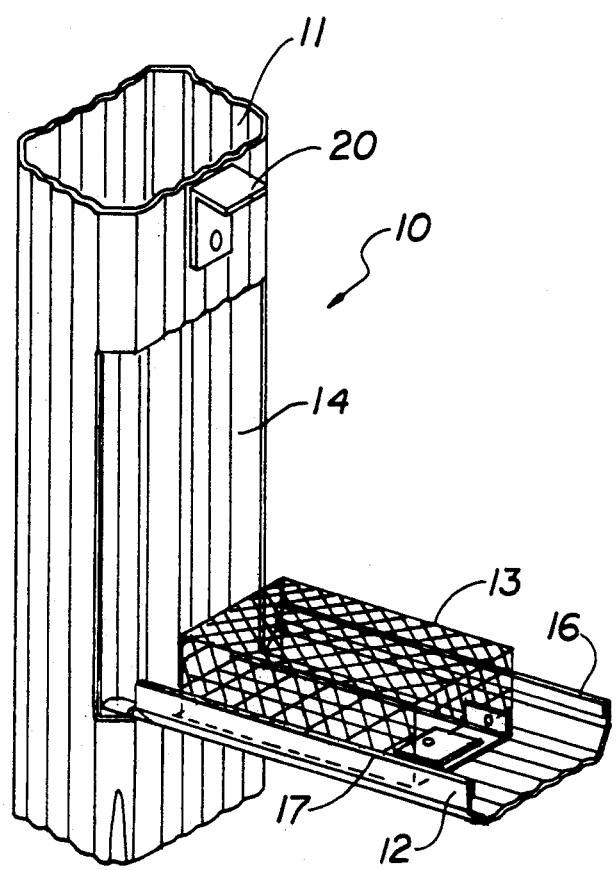
FIG. 2 is a perspective view of the leaf trap assembly of FIG. 1 with its door opened to reveal a foraminous receptacle.

As best seen in FIG. 2, the elongated hollow body 11 has an opening 14 in a mid-section of one vertical side, preferably extending across one face of the hollow body and partially around each of the sides. The opening 14 is at least about five inches in length and at least about three inches in width. Preferably, the opening 14 is from about five inches to about ten inches long and from about three inches to about five inches wide to accommodate the foraminous receptacle 13 as further discussed below.

The detachable door 12 is dimensioned to substantially cover the opening 14 in the elongated hollow body 11. It has the same general shape as the opening with some additional length and width to lap over the edges of the opening 14 so as to close off the interior of the elongated hollow body. The door 12 is capable of complete separation and removal from the elongated hollow body.

Figure 4:
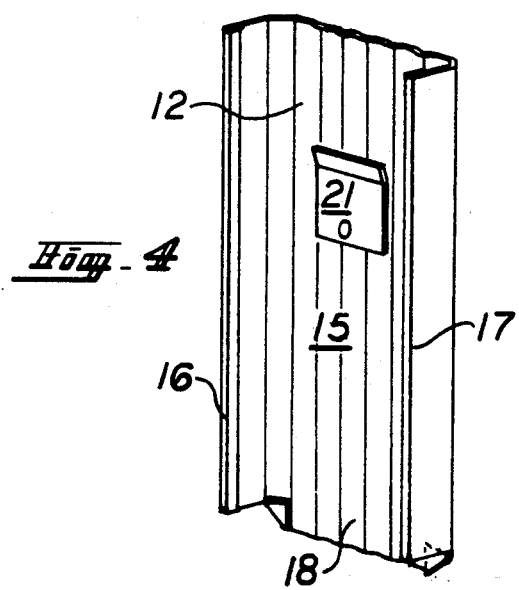
FIG. 4 is a perspective view showing the inside surface of the door of the assembly of FIG. 1 when removed therefrom.

As best seen in FIG. 4, the door has a main body member 15, side flange members 16 and 17 and a lower flange member 18. The side flange members are flared out sufficiently to slide over the side walls of the elongated hollow body. For safety reasons, the side flange member edges are rolled-over flat. The lower flange member 18 extends from the main body member of the door sufficiently to readily slide into the opening. This structural feature ensures that as rain water flows along the door it will remain inside the elongated hollow body and downspout. For ease of door positioning, the lower flange member 18 is tapered inwardly at each longitudinal edge. As should be readily apparent, when the door is added to the hollow body by first inserting the lower flange member 18 into the opening 14 of the hollow body, contact will be made by the lower edge of the side flange members and the opening's lower edge to prevent further downward movement of the door. The door's structure allows it to be positioned in the opening and remain there without the need for permanent attaching means.

A catch 20 is required on the elongated hollow body 11 sufficiently above the opening 14 so as to engage the door when the door is made flush with the hollow body to keep it closed. Rain water flowing through the elongated hollow body will tend to force the door outwardly without the benefit of the catch as will the spring-like action of the foraminous receptacle positioned within the hollow body as further discussed below. The catch 20 depicted is a right angle bracket revolvingly secured to the hollow body to allow it to move from a position where it engages the door as shown in FIG. 1 to a position of non-engagement as shown in FIG. 2. Other catches can as well be used, e.g. a slide catch and a magnetic catch.

Further positioned on an inside surface of the door 12 is a latch means 21. The latch means is a plate with a flared top edge to aid in receiving a mating latch found on the foraminous receptacle and further discussed below.

The assembly 10 of the invention also comprises the foraminous receptacle 13. The receptacle is dimensioned to fit within the elongated hollow body 11. Its purpose is to separate solid matter from rain water which passes down the downspout and through the elongated hollow body. The receptacle has an open top side 22 to receive the solid matter and a partially open backside 23 to aid in dumping solid matter from the receptacle during a periodic cleaning operation. The open portion on the backside extends from about 15% to about 85% of the length of the receptacle. The receptacle itself is preferably fabricated from a mesh material, e.g. a metal screen having a mesh opening size of from about 0.1 inches to about 0.5 inches. Preferred is a 0.25 inch honeycomb opening mesh screen. It should be apparent the smaller the opening in the receptacle, the greater the quantity of solid matter trapped; however, also greater will be the need to periodically inspect and clean the receptacle.

The receptacle 13 has a box-like shape with a flat backside to fit flush against the inside surface of the door. Other receptacle shapes are usable. Other foraminous materials can as well be used, provided sufficient openings are present to allow rain water to pass through while leaving solid matter behind. A receptacle formed from plastic for example is also feasible. Preferably, the receptacle has a length which extends about 50% to about 90% of the length of the door.

Figure 3:
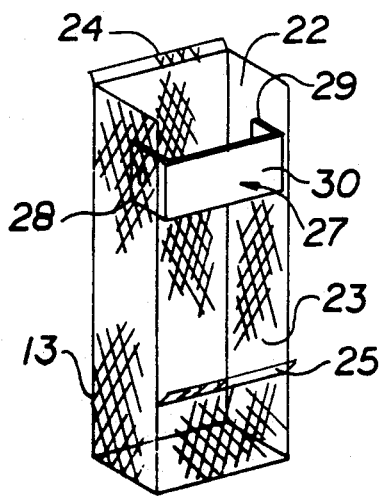
FIG. 3 is a perspective view showing the foraminous receptacle of the assembly of FIG. 1 when removed therefrom.

A highly preferred embodiment of the invention utilizes a foraminous receptacle with outwardly extending flanges to abut against the interior walls of the elongated hollow body. As best seen in FIG. 3, a top edge 24 of the front side of the receptacle is flared sufficiently outward to engage a wall of the elongated hollow body 11. Similarly, a bottom edge 25 defining the partially open backside of the receptacle 13 is flared outwardly sufficiently to engage an opposite wall of the hollow body 11. The flared out edges 24 and 25 act to trap solid matter in rain water flowing adjacent the walls of the hollow body. It should be apparent that the spring-like action of the flared top edge 24 will tend to force the door 12 open during use, thereby necessitating engagement of the catch 20 with the door.

The foraminous receptacle 13 also has a rigid plate 27 extending across the partially open backside to mate with the latch means found on the door. The plate also adds a degree of rigidity to the foraminous receptacle to keep it from partially collapsing. The plate 27 has ears 28 and 29 extending at right angles to a horizontal member 30. It is dimensioned to fit completely across the open portion of the backside and attach to the sides of the receptacle. The plate 27 additionally is positioned so that when the receptacle is mounted onto the door 12, the receptacle fits within the area confines of the door.

It should be apparent from the foregoing description of the assembly that the detachable door 12 can be completely removed from the assembly 10 and the foraminous receptacle 13 can be completely removed from the door. These features contribute to the ease of use of the assembly.

In operation, the elongated hollow body of the assembly is initially installed into a section of downspout. In new construction, downspout sections are simply measured and cut such that the elongated hollow body will be positioned preferably near ground surface. In a retrofit situation, a section of existing downspout will be cut out, the length of which will be about equal to that of the elongated hollow body. By flaring and crimping of the ends of the hollow body in a known fashion, the hollow body is permanently installed into the downspout. For appearance purposes, the elongated hollow body is a continuation of the downspout section above and below it. Next, the foraminous receptacle is latched onto the inside surface of the door. The door with the receptacle mounted thereon is simply slipped partially into the opening in the elongated hollow body and pushed closed to become flush with the opening outline. The catch on the elongated hollow body is turned to contact the door and hold it in place. Periodically, the door is opened and removed from the assembly. The receptacle is next most conveniently removed from the door and any solid matter therein dumped through the partially open backside. When cleaned, the receptacle and door are replaced by a simple reversal of steps.

The leaf trap assembly of the invention has been described in detail with reference to the drawings. Various modifications can be made to the assembly. All obvious modifications are considered within the scope of the appended claims.

I claim:

1. A leaf trap assembly for interposing in a downspout having an upper section and a lower section so as to separate solid matter from rain water flowing therethrough, said assembly comprising:
    (a) an elongated hollow body having a first end and a second end and dimensioned for attachment at the first end to the upper section of the downspout and at the second end to the lower section of the downspout to continue the flow of rain water, said hollow body having an opening in one wall thereof to provide access to the hollow body's interior;
    (b) a detachable door positioned in the opening in the elongated hollow body and dimensioned to cover said opening, said door having a latch means on an inside surface; and
    (a) a foraminous receptacle positioned on the detachable door and dimensioned to fit within the elongated hollow body to separate the solid matter from the rain water flowing through the downspout, said receptacle having an open top side nearest the first end of the elongated hollow body to receive the solid matter and rain water and a backside adjacent the detachable door, said backside having an open portion exclusive of the mesh material for removal of solid matter from the receptacle during a clean-out operation, further wherein the receptacle has means to mate with the latch means of the door such that the receptacle is detachably secured to the door during use, yet is capable of complete separation therefrom for periodic removal of solid matter therefrom.

2. The leaf trap assembly of claim 1 wherein the detachable door has a main body member and a side flange member along each longitudinal edge thereof which extends at a substantially right angle to the main body member to longitudinally engage an outside surface of the elongated hollow body.

3. The leaf trap assembly of claim 2 wherein the detachable door further has a lower flange member nearest the second end of the elongated hollow body, said lower flange member extending from the main body member to fit into the opening of the elongated hollow body in a manner such that the side flange members of the detachable door restrict movement of the door towards the second end of said hollow body.

4. The leaf trap assembly of claim 3 wherein the means on the foraminous receptacle for mating with the latch means on the detachable door is a rigid cross piece extending across the open portion of the backside.

5. The leaf trap assembly of claim 4 wherein the latch means secured to the detachable door is a rigid plate with a flared upper flange nearest the first end of the elongated hollow body to receive the rigid cross-piece of the foraminous receptacle to detachably hold said receptacle to said door.

6. The leaf trap assembly of claim 1 wherein the elongated hollow body has a rectangular cross section and the foraminous receptacle is dimensioned to fit within said elongated hollow body.

7. The leaf trap assembly of claim 6 wherein the foraminous receptacle is fabricated from a mesh material.

8. The leaf trap assembly of claim 7 wherein the mesh material has a mesh opening size ranging from about 0.1 inch to about 0.5 inch.

9. The leaf trap assembly of claim 7 wherein the open portion of the backside of the foraminous receptacle extends from about 15% to about 85% of the length of said backside.

10. The leaf trap assembly of claim 1 wherein the elongated hollow body further has a catch mounted near the first end of said hollow body and adjacent the opening to engage the detachable door in a closed position during normal use.

11. The leaf trap assembly of claim 10 wherein a top edge of the foraminous receptacle front side nearest the first end of the elongated hollow body is flared sufficiently outward to engage a wall of the elongated hollow body.

12. The leaf trap assembly of claim 11 wherein an edge of the open portion of the foraminous receptacle nearest the second end of said hollow body is flared sufficiently outward to engage a wall of the elongated hollow body.

13. The leaf trap assembly of claim 12 wherein the catch mounted on the elongated hollow body is a right angle bracket revolvingly secured to said elongated hollow body.

14. A leaf trap assembly for interposing in a downspout to separate solid matter from rain water flowing therethrough, said assembly comprising;
    (a) an elongated hollow body having a first end, a second end and vertical side walls and dimensioned for attachment at the first end to an upper section of the downspout and at the second end to a lower section of the downspout to continue the flow of rain water, said hollow body having an opening in one of said vertical side walls to provide access to the hollow body's interior;
    (b) a detachable door positioned in the vertical side wall opening of the elongated hollow body and capable of being completely removed therefrom, said door dimensioned to cover the opening and having (i) a main body member (ii) a side flange member along each longitudinal edge thereof and at a substantially right angle thereto so as to engage an outside surface of the elongated body, (iii) a flange member extending from the main body member to fit into the opening of the elongated hollow body nearest the second end in a manner such that the side flange members restrict downward movement of the door towards the second end of said hollow body, and (iv) a rigid plate latch means on an inside surface of said main body member; and
    (c) a foraminous receptacle positioned on the detachable door and dimensioned to fit within the elongated hollow body, said receptacle having an open top side nearest the first end of the elongated hollow body to receive the solid matter and rain water flowing from the upper section of the downspout and walls made from a mesh material to allow the rain water to flow through mesh openings while retaining the solid matter and wherein a backside wall adjacent the detachable door has an open portion exclusive of the mesh material sufficiently large for removal of retained solid therethrough when the foraminous receptacle is removed from the door during a clean-out operation, further wherein the receptacle has a rigid cross piece extending across the open portion of the backside to mate with the latch means of the door such that the receptacle is detachably secured to the door during use, yet is capable of complete separation therefrom for periodic removal of solid matter therefrom.

15. The leaf trap assembly of claim 14 wherein the latch means secured to the detachable door is a rigid plate with a flared flange to receive the rigid cross-piece of the foraminous receptacle to detachably hold said receptacle to said door.

16. The leaf trap assembly of claim 15 wherein the foraminous receptacle is fabricated from a mesh material having a mesh opening size ranging from about 0.1 inch to about 0.5 inch.

17. The leaf trap assembly of claim 16 wherein the open portion of the backside of the foraminous receptacle extends from about 15% to about 85% of the length of the backside.

18. The leaf trap assembly of claim 17 wherein said walls comprise a front side wall opposite said backside wall, and wherein an edge of the foraminous receptacle front side wall nearest the first end of said hollow body is flared sufficiently outward to engage a wall of the elongated hollow body.

19. The leaf trap assembly of claim 18 wherein the open portion of the backside wall of the foraminous receptacle has an edge nearest the second end of said hollow body which is flared sufficiently outward to engage a wall of the elongated hollow body.

* * * * *